(12) United States Patent
Yamaguchi

(10) Patent No.: US 7,570,302 B2
(45) Date of Patent: *Aug. 4, 2009

(54) IMAGE-CAPTURE APPARATUS INCLUDING LIGHT-GUIDING ELEMENT HAVING INCLINED SURFACE

(75) Inventor: Toshinobu Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

This patent is subject to a terminal disclaimer.

(21) Appl. No.: 11/248,294

(22) Filed: Oct. 13, 2005

(65) Prior Publication Data

US 2006/0044443 A1    Mar. 2, 2006

Related U.S. Application Data

(62) Division of application No. 09/861,772, filed on May 22, 2001, now Pat. No. 6,992,724.

(30) Foreign Application Priority Data

May 25, 2000    (JP) .............................. 154713/2000

(51) Int. Cl.
*H04N 5/225* (2006.01)
*H04N 5/222* (2006.01)
*H04N 5/64* (2006.01)

(52) U.S. Cl. .................. 348/374; 348/333.01; 348/794

(58) Field of Classification Search ............ 348/333.01, 348/333.08, 373, 375, 794, 790, 791, 801, 348/802; 396/374, 384, 385; 345/102
See application file for complete search history.

(56) References Cited

U.S. PATENT DOCUMENTS

| 5,703,667 | A | * | 12/1997 | Ochiai | 349/65 |
| 5,729,289 | A | | 3/1998 | Etoh | 348/333.02 |
| 5,748,237 | A | | 5/1998 | Ueda et al. | 348/333.08 |
| 5,764,292 | A | | 6/1998 | Yamaguchi | 348/363 |
| 6,151,166 | A | | 11/2000 | Matsushita et al. | 359/566 |
| 6,181,380 | B1 | | 1/2001 | Toyofuku et al. | 348/373 |
| 6,254,245 | B1 | | 7/2001 | Uehara | 362/31 |
| 6,322,225 | B1 | | 11/2001 | Koike | 362/31 |
| 6,404,981 | B1 | | 6/2002 | Kumagai et al. | 386/125 |
| 6,608,650 | B1 | | 8/2003 | Torres et al. | 348/333.02 |
| 6,621,520 | B1 | | 9/2003 | Sawanobori | 348/341 |
| 6,731,341 | B1 | | 5/2004 | Uchiyama | 348/374 |
| 6,856,353 | B1 | * | 2/2005 | Misawa | 348/333.07 |
| 7,018,088 | B2 | * | 3/2006 | Yu et al. | 362/620 |
| 2001/0050716 | A1 | * | 12/2001 | Hashimoto et al. | 348/333.01 |

(Continued)

FOREIGN PATENT DOCUMENTS

JP    07177398 A  *  7/1995

(Continued)

*Primary Examiner*—John M Villecco
(74) *Attorney, Agent, or Firm*—Fitzpatrick, Cella, Harper & Scinto

(57) ABSTRACT

An image-capture apparatus includes an imaging element, a display, and a light-guiding member having an inclined surface, where the light-guiding member is disposed so that a portion of the light-guiding member having a reduced thickness at the inclined surface is disposed behind the imaging element. The light-guiding member reflects light to be applied to the display at the inclined surface and guides the light to the display.

2 Claims, 3 Drawing Sheets

U.S. PATENT DOCUMENTS

2002/0172039 A1* 11/2002 Inditsky .................. 362/231

FOREIGN PATENT DOCUMENTS

| JP | 10123330 A | * | 5/1998 |
| JP | 10177806 A | * | 6/1998 |
| JP | 10-336496 | | 12/1998 |
| JP | 11-109339 | | 4/1999 |
| JP | 11-224057 | | 8/1999 |
| JP | 11295714 A | * | 10/1999 |
| JP | 2000-069342 | | 3/2000 |
| JP | 2000-092355 | | 3/2000 |
| JP | 2000-105543 | | 4/2000 |
| JP | 2000-132113 | | 5/2000 |
| JP | 2000162576 A | * | 6/2000 |

* cited by examiner

IMAGE-CAPTURE APPARATUS INCLUDING LIGHT-GUIDING ELEMENT HAVING INCLINED SURFACE

This application is a divisional of U.S. patent application Ser. No. 09/861,772, filed on May 22, 2001, now pending.

BACKGROUND OF THE INVENTION

1. Field of the Invention

The present invention relates to image-capture apparatuses. In particular, the present invention relates to an image-capture apparatus such as an electronic camera which includes a display.

2. Description of the Related Art

Hitherto, electronic cameras have been developed in which images are photoelectrically converted by imaging elements such as charge-coupled devices (CCDS) instead of recorded on films, and photoelectrically converted image data are recorded on internal solid memories or detachable recording media.

Conventional electronic cameras include color liquid crystal panels as monitors, which may be used for reproducing and displaying captured images, or alternatively, as viewfinders for displaying images photoelectrically converted by the imaging elements.

A known electronic camera shown in FIG. 3 includes a camera body 21, an image-pickup lens unit 22, an imaging element 23 which is, for example, a CCD for converting incident light from an object through the image-pickup lens unit 22 into an electrical signal, and an imaging-element-holding plate 24 for holding and fixing the imaging element 23 to the image-pickup lens unit 22. The known electronic camera also includes a liquid crystal panel 25, and a backlight 26 disposed behind the liquid crystal panel 25 for supplying light to the liquid crystal panel 25. In the illustrated embodiment, the backlight 26 is a plane lamp illuminant at the overall surface thereof, e.g., by using a planar cold-cathode tube. The camera further includes a memory card 27 as a detachable recording medium, a connector 28 for affixing the memory card 27, a battery 29, and a release button 30.

In the known electronic camera thus formed, a drawback has been found in that it is difficult to reduce the thickness of a camera body in which the liquid crystal panel 25 and the backlight 26 are disposed behind the imaging element 23.

SUMMARY OF THE INVENTION

According to an aspect of the present invention, an image-capture apparatus comprises an imaging element, a display, and a light-guiding member having an inclined surface, disposed so that a portion of the light-guiding member, which is reduced in thickness at the inclined surface thereof, is disposed behind the imaging element. The light-guiding member reflects light to be applied to the display at the inclined surface and guides the light to the display. The image-capture apparatus can be reduced in thickness even when the display is disposed behind the imaging element.

Further objects, features and advantages of the present invention will become apparent from the following description of the preferred embodiments.

DESCRIPTION OF THE PREFERRED EMBODIMENTS

Preferred embodiments according to the present invention are described in detail as follows with reference to the drawings.

Figure 1:
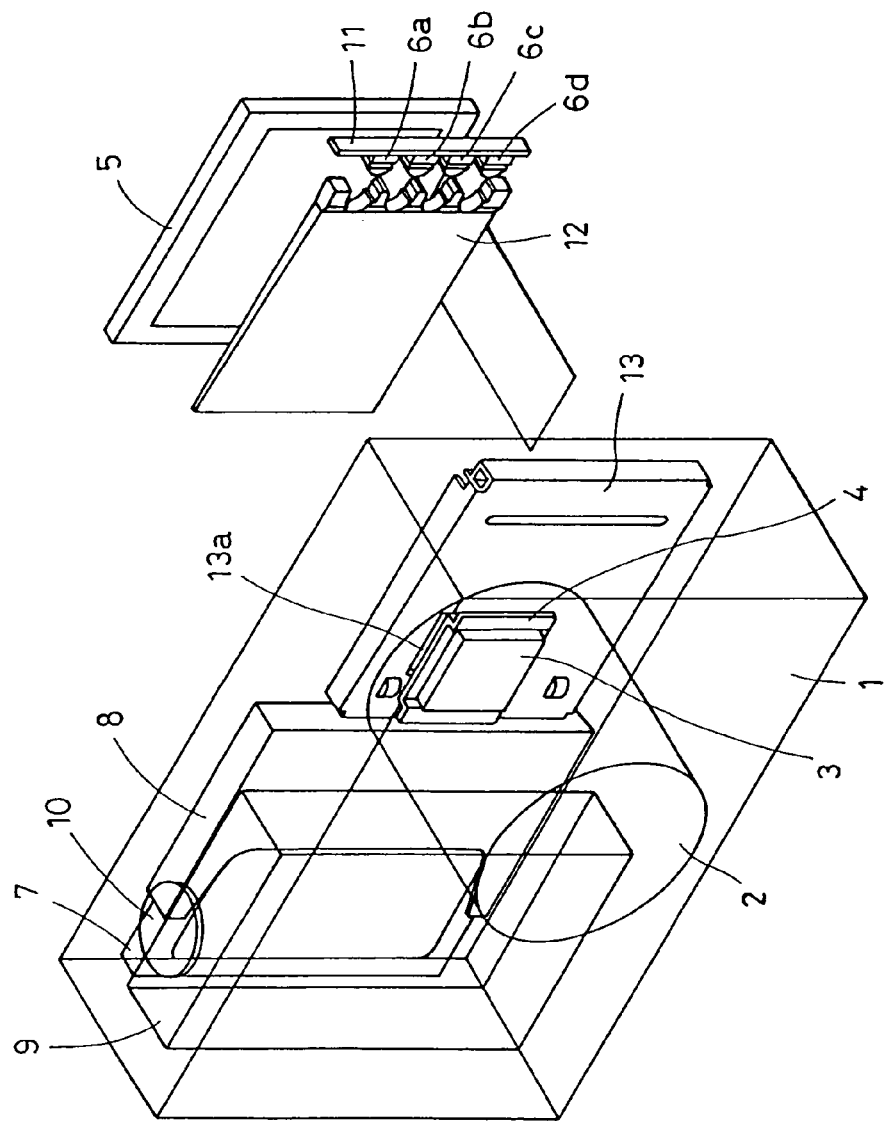
FIG. 1 is a perspective view of a camera according to an embodiment of the present invention.

FIG. 1 is a perspective view of an electronic camera according to an embodiment of the present invention.

FIG. 1 shows a camera body 1, and an image-pickup lens unit 2 positioned substantially at a center of the camera body 1. An imaging element 3, such as a charge-coupled device (CCD), is disposed behind the image-pickup lens unit 2. The imaging element 3 receives light incident from an object through the image-pickup lens unit 2, and converts the light into an electrical signal as an image signal. An imaging-element-holding plate 4 holds the imaging element 3 and fixes the same to the image-pickup lens unit 2. A rectangular liquid crystal panel 5 is disposed behind the imaging element 2, and displays an image formed in accordance with the image signal, which is an electrical signal photoelectrically converted by the imaging element 2. The liquid crystal panel 5 is disposed so that longitudinal sides (edges) of the liquid crystal panel 5 are oriented in a horizontal direction of the camera body 1. A light-guiding plate 12 guides light emitted from white-light emitting diodes (white LEDs) 6a, 6b, 6c, and 6d to the liquid crystal panel 5. The light-guiding plate 12 is formed substantially in the same shape (plan view) as that of the liquid crystal panel 5, and is disposed/oriented so that the longer sides and the shorter sides of the light-guiding plate 12 substantially overlap the longer sides and the shorter sides, respectively, of the liquid crystal panel 5. White LEDs 6a, 6b, 6c, and 6d are soldered to a substrate 11 and provided at a shorter side (vertical edge) of the light-guiding plate 12. The liquid crystal panel 5, the white LEDs 6 (6a-6d), the substrate 11, and the light-guiding plate 12 are held as a unit by a holder 13, and are disposed behind the image-pickup lens unit 2 and the imaging element 3. A memory card 7 is a detachable recording medium. A connector 8 affixes the memory card 7. A battery 9 is disposed at a side of the image-pickup lens unit 2. A release button 10 is disposed at the upper side of the camera body 1.

Figure 2:
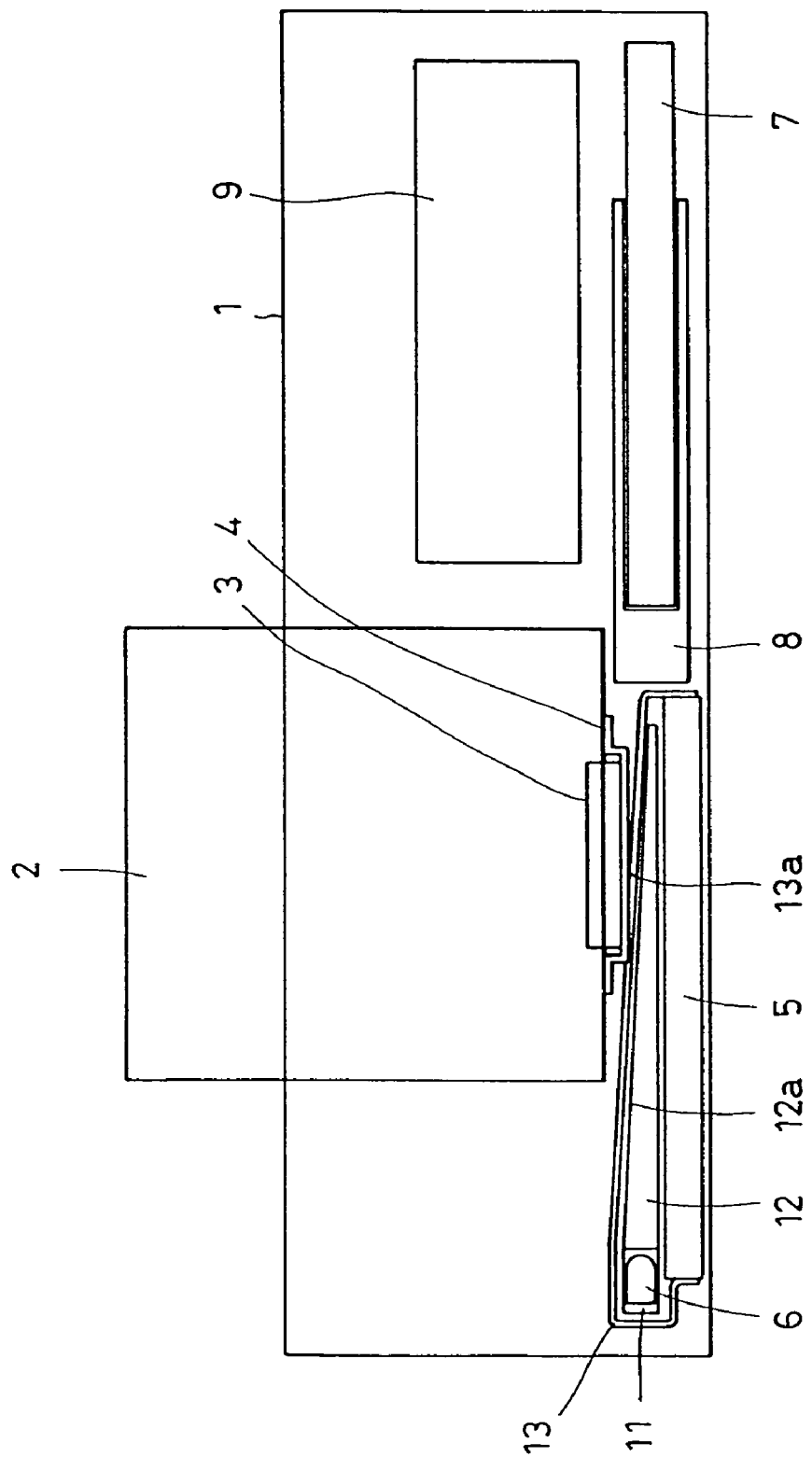
FIG. 2 is a sectional view from the top of the camera shown in FIG. 1.
Figure 3:
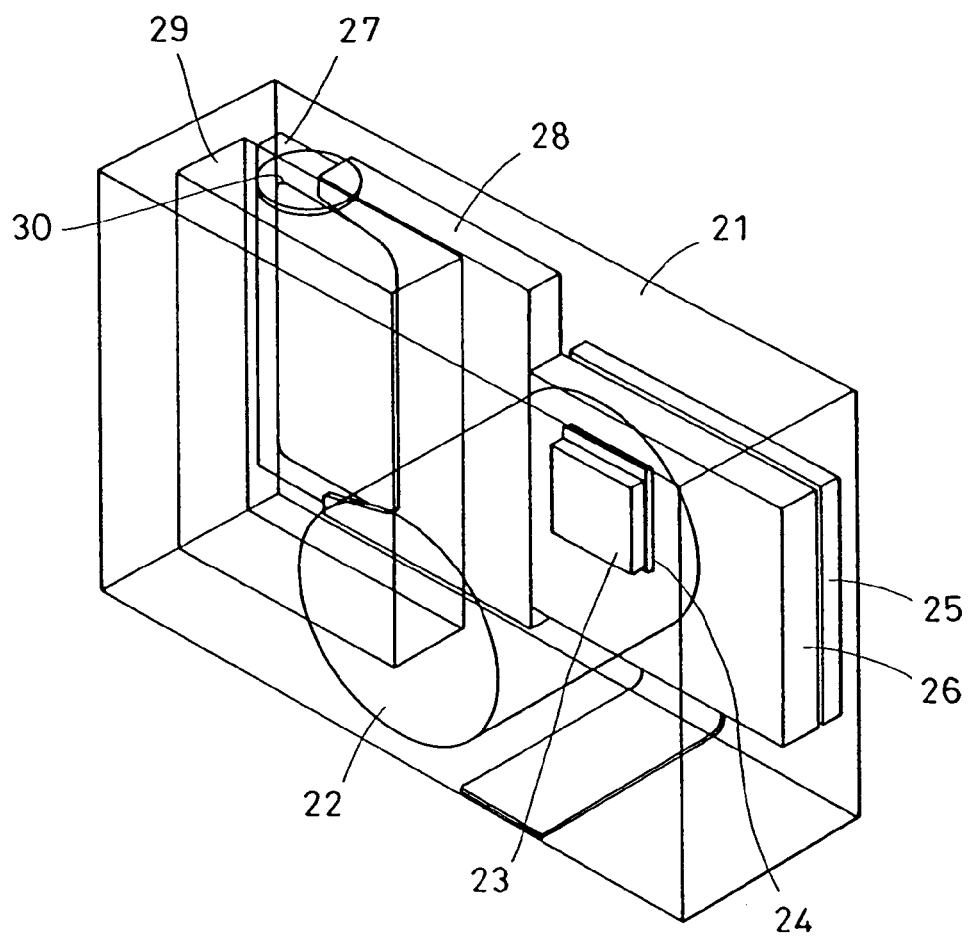
FIG. 3 is a perspective view of a known camera.

FIG. 2 is a sectional view from the top of the electronic camera shown in FIG. 1.

As shown in FIG. 2, the light-guiding plate 12 is formed in a wedge-shape such that the surface thereof opposite the liquid crystal panel 5 is inclined so as to form an inclined surface 12a which is inclined (tapered) in a horizontal direction of the camera body 1; the light-guiding plate 12 is thicker at the side of the light-guiding plate 12 adjacent the white LEDs 6a, 6b, 6c, and 6d, and is thinner at the other side. The light-guiding plate 12 thus forms a rectangular wedge-shaped prism. The thicker side of the light-guiding plate 12 is disposed at a side face of the camera body 1 together with the white LEDs 6a, 6b, 6c, and 6d, and the thinner side of the light-guiding plate 12 is disposed behind (including right back portion of) the imaging element 3 and in front of the liquid crystal panel 5. That is, the light-guiding plate 12 is disposed so as to be sandwiched by the imaging element 3 and the liquid crystal panel 5, and is received in the holder 13 together with the liquid crystal panel 5. Light emitted from the side of the light-guiding plate 12 by the white LEDs 6a, 6b, 6c, and 6d is reflected at the inclined surface 12a and is applied to the overall (entire) back face of the liquid crystal panel 5. In the above configuration, a rearward projection of the imaging element 3 is accommodated (received) by a space formed at the thinner part of the light-guiding plate 12. Therefore, the image-capture apparatus can be reduced in thickness even when the liquid crystal panel 5 is disposed behind the imaging element 3.

The holder 13 is provided with a hole (cut-away part) 13a formed in the holder 13 in a position at the back of the imaging-element-holding plate 4. The rearward projection of the imaging element 3 is also accommodated (received) by the hole 13a of the holder 13 when the imaging-element-holding plate 4 is received in the hole 13a, whereby the image-capture apparatus can be further reduced in thickness.

In the above configuration, incident light from an object is received by the imaging element 3 through the image-pickup lens unit 2, is converted into an electrical signal which is processed by a signal processing circuit (not shown), and is displayed as an image on the liquid crystal panel 5.

Image-capturing starts when a user presses the release button 10 (see FIG. 1), and the analog image signal input to the imaging element 3 is converted to a digital signal and is recorded on the memory card 8.

According to the present embodiment of the present invention, an image-capture apparatus is provided in which the thickness of the image-capture apparatus can be reduced even when the display is disposed behind the imaging element.

The individual components shown in schematic or block form in the drawings are all well-known in the camera arts and their specific construction and operation are not critical to the operation or best mode for carrying out the invention.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, a cold-cathode tube may be used as a light source instead of the white LEDs 6a, 6b, 6c, and 6d according to the present embodiment. According to the present embodiment, when using the cold-cathode tube as a light source, the cold-cathode tube, which generates relatively large noises, can be disposed remote from the imaging element 3 by disposing the cold-cathode tube at a shorter side (vertical edge) of the light-guiding plate 12, whereby the effect of noise from the light source on the imaging element can be reduced.

Although according to the present embodiment, a charge-coupled device (CCD) is used as the imaging element 3, an area light-receiving sensor, such as a complementary metal-oxide semiconductor (CMOS), or a light-receiving sensor, such as a line sensor, may be used as the imaging element 3.

Although according to the present embodiment, the rearward projection of one part of the imaging element 3 is received in a space formed at the thinner portion of the light-guiding plate 12 and in the hole 13a of the holder 13, the entire imaging element 3 may be received in the space formed at the thinner portion of the light-guiding plate 12 and in the hole 13a of the holder 13.

The present invention may be carried out in the form of an independent apparatus which incorporates all or part of the claimed features and features of the described embodiment. The invention may also be combined with another type of apparatus, or be incorporated in an apparatus so as to serve as a component thereof.

The present invention may be applied to various types of cameras such as an electronic camera for capturing still images and/or moving images, a camera using a silver-salt film, a single-lens-reflex camera, a lens-shutter camera, and a surveillance camera. The invention also may be applied to image-capture apparatuses, optical apparatuses, and the like other than cameras, apparatuses used in these cameras, image-capture apparatuses, optical apparatuses, and other apparatuses, and components forming these apparatuses.

What is claimed is:

1. An image capture apparatus comprising:
   a lens unit;
   an imaging element which changes incident light into an electrical signal, the imaging element being disposed in the lens unit and having a projected part which projects from the lens unit;
   a display element which displays an image converted into the electrical signal by the imaging element;
   a light source; and
   a light guiding member which guides light of the light source to the display element, the thickness of the first side of the light guiding member being thinner than the thickness of a second side of the light guiding member and an inclined surface is formed between the first and second side of the light guiding member,
   wherein the projected part of the imaging element is accommodated in a space defined by a difference in thickness between the first and second side of the light guiding member wherein the imaging element does not protrude from the first side of the light guiding member in a longitudinal direction of the image capture apparatus.

2. An image capture apparatus according to claim 1, further comprising
   a holder that holds the light guiding member, the holder having a hole therein that receives at least the projected part of the imaging element.

* * * * *